United States Patent [19]

Lacuve

[11] Patent Number: 4,927,256

[45] Date of Patent: May 22, 1990

[54] MULTISPECTRAL OPTICAL DEVICE COMPRISING MIRRORS

[75] Inventor: Jean Lacuve, Athis Mons, France

[73] Assignee: Societe d'Applications Generales d'Electricite et de Mecanique Sagem, Paris, France

[21] Appl. No.: 385,129

[22] Filed: Jul. 26, 1989

[30] Foreign Application Priority Data

Jul. 26, 1988 [FR] France ............................... 88 10060

[51] Int. Cl.⁵ ................................................ G02B 5/10
[52] U.S. Cl. ..................................... 350/619; 350/629; 350/504; 350/537
[58] Field of Search ............... 350/619, 620, 629, 504, 350/505, 537, 443

[56] References Cited

U.S. PATENT DOCUMENTS

| | | | |
|---|---|---|---|
| 3,674,334 | 7/1972 | Offner ................................. | 350/620 |
| 4,395,095 | 7/1983 | Horton ................................ | 350/504 |
| 4,439,012 | 8/1984 | Christy ............................... | 350/620 |
| 4,836,666 | 6/1989 | Meinet et al. ...................... | 350/620 |

OTHER PUBLICATIONS

"Designing a Yolo Telescope", by Jose Sasian, *Telescope Making* #37, Summer 1989, pp. 12–15.

*Primary Examiner*—Bruce Y. Arnold
*Assistant Examiner*—Jay Patrick Ryan
*Attorney, Agent, or Firm*—Larson and Taylor

[57] ABSTRACT

A mirror device for providing an image of a remote object, suitable for use in a multi-spectral collimator, comprises a primary concave mirror whose surface is an off-axis portion of a paraboloid having a rotational symetry about an axis, and a secondary concave mirror whose surface is an off-axis portion of a hyperboloid, one focus of which coincides with the focus of the paraboloid. The mirrors have sizes of the same order of magnitude. The primary mirror is so located that a light beam received by it and having a mean ray parallel to the axis of the paraboloid is unobscured by the secondary mirror. The radii of curvatures of the two mirrors at locations along their respective axes do not differ by more than 10%.

9 Claims, 5 Drawing Sheets

MULTISPECTRAL OPTICAL DEVICE COMPRISING MIRRORS

BACKGROUND OF THE INVENTION

1. Technical Field

The invention relates to devices for forming the image of a remote object, suitable for operation throughout a wide range of the spectrum.

There exist more and more applications for which the same optical device must supply the image of a remote object to sensors operating in different wavelength ranges, for example to a television camera operating in the visible spectrum (0.4μ to 0.7μ), to a silicon tube television camera operating from 0.4 to 1μ, to a sensor operating in the near infrared, to a receiver associated with a $CO_2$ laser at 10.6μ. None of the materials transparent for the whole of the range from 0.4 to 14μ is truly appropriate for forming multispectral objective lens common to several sensors, for most of these materials are hygroscopic and those which are not so, have an excessive chromatic dispersion.

2. Prior Art

Devices are further known comprising mirrors for forming the image of a remote object and in particular different types of telescopes. But the known optical mirror devices, although they have the advantage of good efficiency over a very wide frequency range and complete absence of chromatism, on the other hand have two drawbacks which up to now have prohibited their use for numerous applications: most existing systems have a high central obturation and a small field, generally not exceeding 4°.

There is also known (French 1,393,577) a collimator having a primary paraboloid mirror and a secondary hyperboloid mirror which are mutually aligned and have common focuses. The arrangement has all hereinbefore-mentioned drawbacks. The provision of an additional elliptical mirror does not remove them.

SUMMARY OF THE INVENTION

It is an object of the invention to provide a device for forming the image of a remote object, of the type comprising successively a paraboloid-shaped mirror and a hyperboloid-shaped mirror having common focuses which is improved, particularly in that it makes it possible to obtain large fields, without introducing excessive geometric aberration.

For that purpose, there is provided a device of the above-defined type, wherein the paraboloid-shaped mirror and the hyperboloid-shaped mirror are formed by off axis portions of respective conoids and have dimensions of the same order of magnitude, the paraboloid is placed so that an incident beam whose mean ray is parallel to the axis of the paraboloid has an angle of incidence on the paraboloid mirror such as the hyperboloid mirror does not cut off the incident beam and the radii of curvature of the two mirrors along their axis do not differ by more than 10%.

An angle of incidence on the paraboloid mirror will generally be adopted less than the angle of incidence on the hyperboloid mirror, so as to permit to adopt planar dimensions of the two mirrors of the same order of magnitude without cutting off the beam by the hyperboloid mirror. Often, the two mirrors will be oriented so that the total deflection by the device is 90°: this will in particular be the case when azimuth scanning is provided about the axis of the output beam, with a horizontal input beam. In this case, the angle of incidence on the paraboloid mirror will generally be between 15° and 22.5°.

Such a device makes it possible to obtain an image which is strictly stigmatic for a point along the optical axis. By an optimization, the geometric aberration throughout the whole field may be reduced to a value acceptable in most cases. The edge portions of field image may be further improved, over each of the channels obtained by splitting up the beam into several fractions corresponding to different wavelength ranges using dichroic means, by means of one or more conventional centered spherized or aspherized take up lenses. Thus an image is obtained whose quality is homogeneous throughout the whole field.

The invention is applicable in installations of various kinds, whenever it is necessary to have a multi spectral input optical system. Sighting installations and multispectral collimators may in particular be mentioned having a single input port, including cameras operating in the visible field and in the near and/or far infrared and a lateral distance measuring system; the invention also applies when such a single port installation comprises an illumination, designation or range-filtering laser (for example a YAG laser working at 1.06μ, a helium-neon laser working at 0.63μ and/or a $CO_2$ laser working at 10.6μ). Among other possible applications may be mentioned path plotting sights, apparatuses plotting the path of aircrafts during landing on carriers possibly used as input elements to an automatic carrier landing system, infrared monitoring systems.

The invention will be better understood from the following description of a particular embodiment, given by way of non limiting example. The description refers to the accompanying drawings.

DETAILED DESCRIPTION OF A PREFERRED EMBODIMENT

Figure 1:
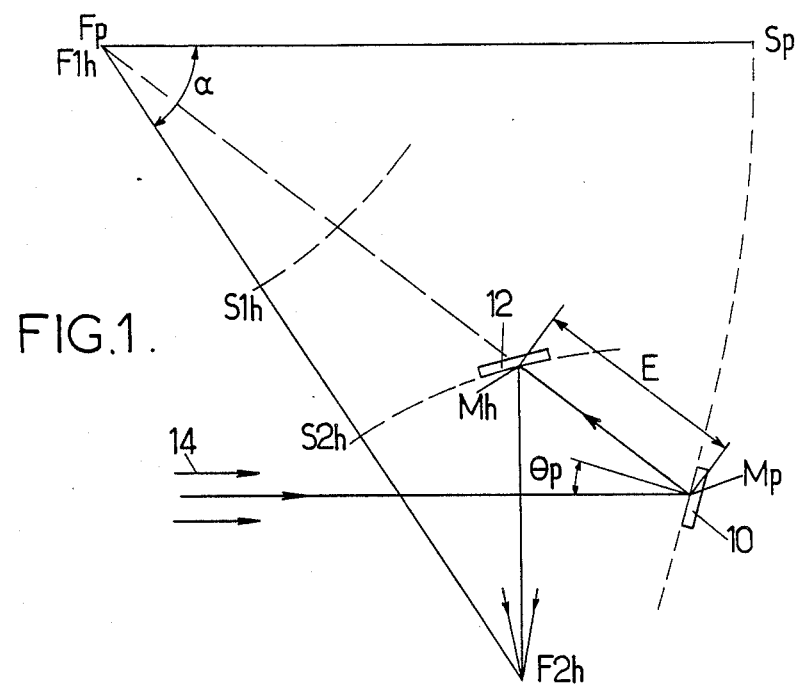
FIG. 1 is a general diagram showing the relative arrangement of the mirrors of a device of the invention and notations used.
Figure 2:
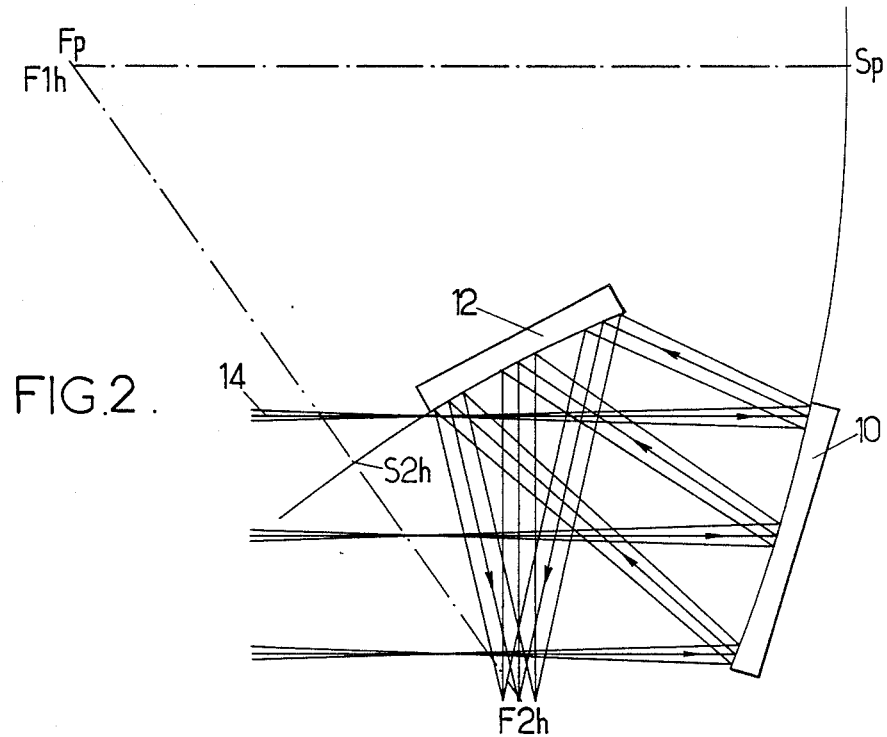
FIG. 2, similar to FIG. 1, shows a geometric arrangement of the mirrors corresponding to a particular case.

The device of the invention shown schematically in FIG. 1 comprises two mirrors each having a concave surface which are off-axis portions of a paraboloid of revolution and a hyperboloid of revolution, respectively. They will be designated as aparaboloid mirror 10 and a hyperboloid mirror 12. For clarity, the parameters concerning the paraboloid and hyperboloid mirrors will be designated by symbols to which the indices p and h will be respectively added.

The paraboloid mirror 10 has a reflection surface which receives the mean ray of the input beam 14 at a point Mp, with an angle of incidence $\theta p$. The reflecting surface is formed by a section of a paraboloid with an apex Sp and a focal length SpFp. The device is used under conditions such that the incident beam 14 is substantially parallel to the axis of the paraboloid.

The hyperboloid mirror 12 of the device has a reflecting surface, which receives the mean ray at Mh and is formed by a fraction of one of the layers of the hyperboloid, whose apex is S2H and whose axis forms an angle $\alpha 0$ with that of the paraboloid. The eccentricity of the hyperboloid and its relative position with respect to the paraboloid are such that, in the arrangement shown in FIG. 1, the focus F1h contained in the concavity of that layer of the hyperboloid which is other than that of which the mirror forms a fraction, coincides with the focus Fp of the paraboloid. The set of mirrors delivers an image at the second focus F2h of the hyperboloid. As shown, the image is formed at F2h, after two reflections, by a beam whose mean ray is perpendicular to the input beam.

For a point on the axis, the image is anastigmatic. To reduce the aberrations throughout the whole field, several conditions must be respected. In order to point them out, the relationships between the different parameters of the device will now be considered. For that, the following notations will be used, in addition to those which have already been defined:

F: overall focal length of the system,
$\gamma$: enlarging power of the hyperboloid for its focuses Fh,
E: distance MpMh between the two mirrors, along the mean ray,
Z(X,Y): general equation of a first order aspheric surface in the reference frame X,Y,Z in which Z is the axis of symmetry,
R: radius of curvature at the apex S of the aspheric surface,
$\theta$: angle of incidence on the mirror.

The above parameters are related to each other by several relationships:

$$F = (FpMp).(MhF2h)/MhF1h = (FpMp)\cdot\gamma$$

and, for a half branch of each aspheric surface:

$$Z = \frac{X^2 + Y^2}{R\left[1 + \sqrt{1 - \frac{(cc + 1)(X^2 + Y^2)}{R^2}}\right]}$$

where cc is a fixed coefficient, called aspherisation coefficient.

For a paraboloid, $cc = 1$; the radius of curvature at the apex is equal to $(2F/\gamma)\cos^2\theta$ and the degree of off-centering, i.e. the distance between the axis FpSp of the paraboloid and the mean incident ray, is equal to $(F/\gamma)\sin(2\theta)$.

For a hyperboloid, the radius of curvature and the aspherisation coefficient are related to $\gamma$ by the relationships:

$$Rh = (F - \gamma E)\frac{1 + \sin(2\theta)}{1 - \gamma}$$

$$CC = -1 - 2\frac{\gamma}{(1 - \gamma)^2}[\sin(2\theta) + 1]$$

The angle $\alpha$ between the axes of the paraboloid and the hyperboloid is related to $\theta p$ by:

$$tg(\alpha) = (\sin 2\theta p + \gamma)/\cos 2\theta p$$

Finally the distance ShFp is related to R by:

$$ShFp = ShF1h = Rh/(\sqrt{-cc} - 1)$$

It appears from the above relationships that the off-centering is proportional to the overall focal length F and to $\sin 2\theta$. It is consequently necessary to avoid focal lengths which are too long which result in degrees of off-centering of the mirrors which are too great and consequently render them difficult to manufacture, especially when the manufacture involves forming a complete cap from which the mirror itself is then cut out. In practice, the solution is of particular advantage for focal lengths F between 400 and 700 mm.

The angular opening along the axis is not limited by the geometric aberrations. But, in order to avoid partial cutoff of the beam, the opening will generally be limited to about F/2.

Often, the device will be provided for giving a total deflection of 90°. In most cases, it will be advantageous for the angle of incidence $\theta p$ on the paraboloid to be less (or at most equal) to the angle of incidence on the hyperboloid. In practice, a value between 15° and 22.5° will generally be given to $\theta p$. The distance E between the two mirrors for a focal length between 400 and 700 mm, will generally be between 250 and 300 mm.

To make the aberrations symmetric in the zones of the field distant from the axis, the enlargement of the hyperboloid may be given a value which depends on the angle of incidence $\theta p$. $\gamma$ may be all the higher the lower $\theta$. For a total angular deflection of 90°, a value of $\gamma$ may be adopted which varies from 0.685 to 0.5 for a variation of $\theta$ of from 15° to 22.5°.

Figure 3:
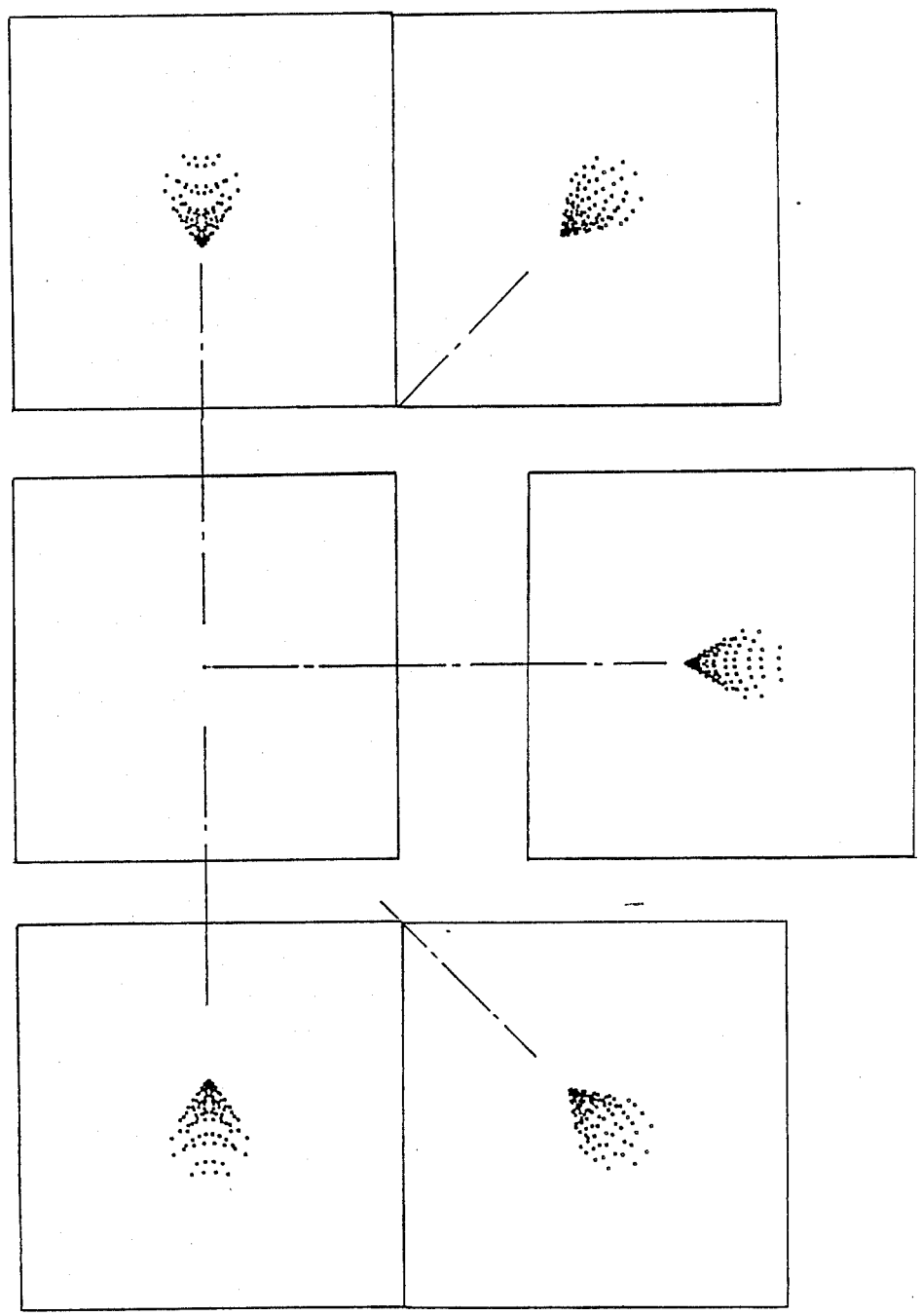
FIG. 3 is a dot diagram showing the even distribution of the aberrations about the axis, in an optimized device in accordance with the invention.

For an angular field which does not exceed 4°, while respecting this relationship between $\theta$ and $\gamma$, a spot at the edge of the field may be obtained in the focal plane of the device of about 0.5 mm, so that the image is acceptable, even in its entirety, in certain cases. FIG. 3 shows, by way of examples, the dot diagram for positions in the middle of the field and at five positions distributed at 45° at the edge of the field, with:

$F = 450$ mm $\theta = 17°$ $\gamma = 0.635$ $E = 260$ mm

Figure 4:
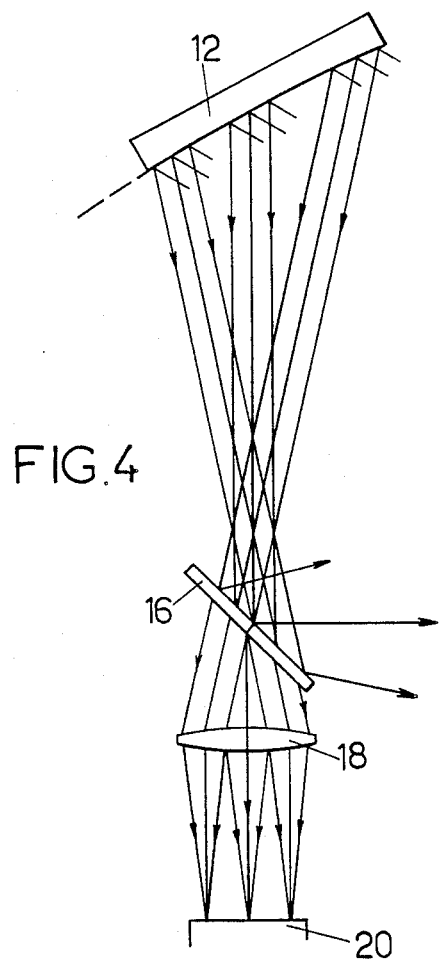
FIG. 4, similar to a portion of FIG. 2, shows the addition of a correction optical system in one of the output channels of a device according to FIG. 2.

When it is necessary to further reduce the aberrations at the edge of the field, correction is made using a lens in the channels which each corresponds to a particular wavelength range. The arrangement shown in FIG. 4 may then be used: a dichroic strip 16 placed in the output beam of the hyperboloid mirror 22 makes it possible to obtain two beams corresponding to two different ranges. FIG. 4 shows an aspheric lens of revolution 18 inserted in one of the beams for correcting the edge of field aberrations and obtaining an image on a detector 20 which is correct throughout the whole field. Mirror 16 may have a front flat reflecting face and a rear curved face, for eliminating the aberrations which a strip with parallel faces would introduce.

Figure 5:
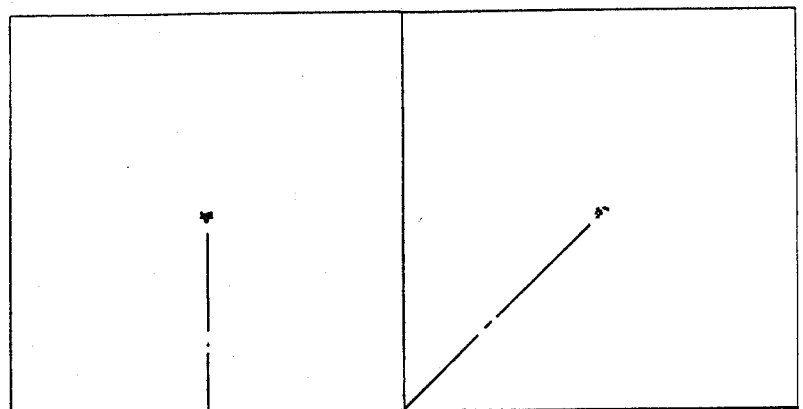
FIG. 5, similar to FIG. 3, shows the aberrations in a device of the kind shown in FIG. 4.
Figure 5:
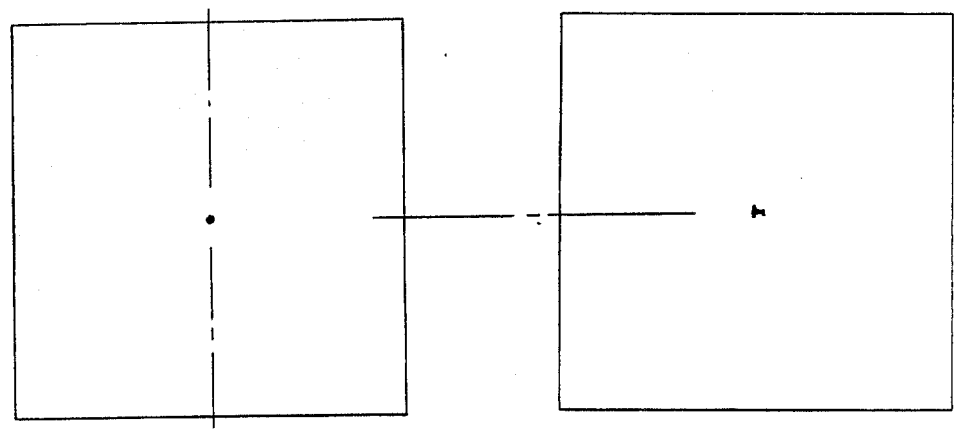
Figure 5:
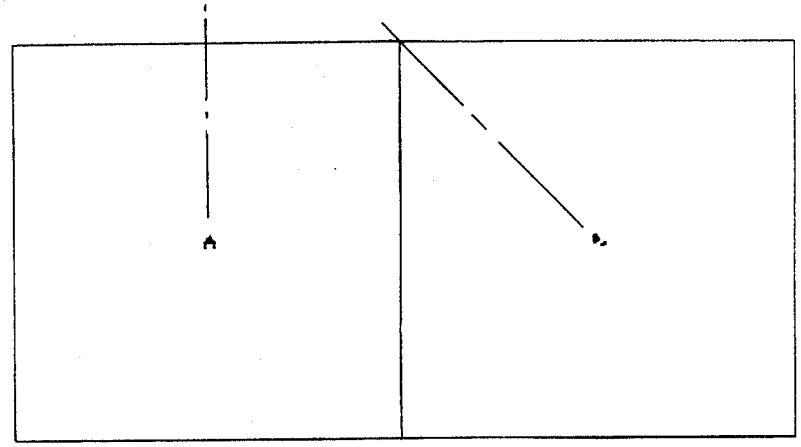

FIG. 5, similar to FIG. 3, shows that the size of the spots at the edge of the field may thus be reduced in a ratio of about 10/1.

Figure 6:
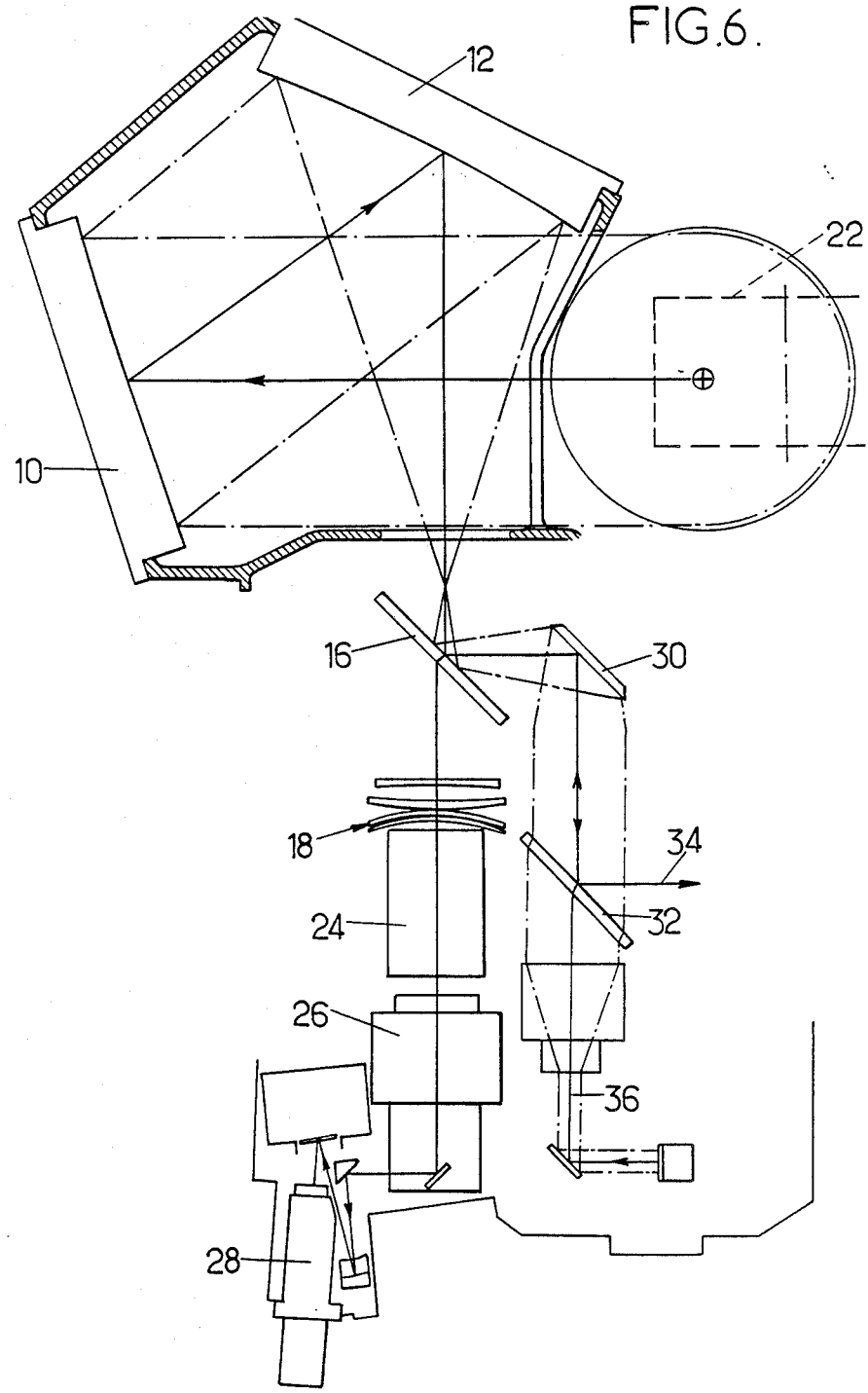
FIG. 6 is a diagram showing a possible arrangement of the optical components of a fire control sighting device using the invention.

A device in accordance with the invention may in particular be incorporated in a stabilized sighting device of the type shown schematically on FIG. 6. The sighting device comprises a deflecting input mirror 22, controlled by a servosystem controlled by a gyroscope, sending a beam of parallel light on the paraboloid mirror 10 under a constant angle of incidence. The output beam from the hyperboloid mirror 12 is split by the dichroic strip 16 which transmits an infrared beam to an optical system 24, a de-rotator 26 and an infrared camera 28. The beam reflected by the dichroic strip 16, comprising for example visible light and near infrared up to 1.54μ, is reflected by a mirror 30 then split by another dichroic strip 32 into a visible channel 34 (whose sensor is for example a television camera) and a laser channel 36.

I claim:

1. Mirror device for providing an image of a remote object, comprising:
   a primary concave mirror whose surface is an off-axis portion of a paraboloid having a rotational symmetry about an axis, and
   a secondary concave mirror whose surface is an off-axis portion of a hyperboloid one focus of which coincides with the focus of the paraboloid, wherein
   the mirrors have sizes of the same order of magnitude,
   the primary mirror is so located with respect to the secondary mirror that a light beam received by the whole of the primary mirror and having a mean ray parallel to the axis of the paraboloid is unobscured by the secondary mirror, and
   the radii of curvatures of the two mirrors along their respective axes do not differ by more than 10%.

2. Device according to claim 1, wherein the angle of incidence on a light beam parallel to the axis of the paraboloid on the primary mirror is smaller than the angle of incidence of the reflected light beam on the secondary mirror.

3. Device according to claim 1, wherein the primary mirror and secondary mirror are mutually arranged for the total deflection of the device to be of 90°.

4. Device according to claim 3, wherein the angle of incidence on the primary mirror is of from 15° to 22.5°.

5. Device according to claim 3, wherein the mirrors have focal lengths of from 400 to 700 mm.

6. Device according to claim 5, wherein the distance between the two mirrors, as measured along said mean ray is of from 250 to 300 mm.

7. Device according to claim 1, wherein the mirrors are sized and dimensioned for the enlarging power of the device to be comprised between 0.685 and 0.5 while the angle of reflection on the primary mirror is of from 15° to 22.5°, the enlarging power being selected at a value which increases for smaller value of the angle of reflection.

8. Device according to claim 7, further comprising means for separating the beam reflected by the secondary mirror into a plurality of partial beams corresponding to different spectral ranges and at least a lens having a rotational symetry located on one at least of the partial beams for correcting coma.

9. Mirror device for providing an image of a remote object, comprising:
   a primary concave mirror whose surface is an off-axis portion of a paraboloid having a rotational symmetry about an axis, and
   a secondary concave mirror whose surface is an off-axis portion of a hyperboloid one focus of which coincides with the focus of the paraboloid,
   the secondary mirror being sized and located with respect to the primary mirror so that an incident light beam received by the whole of the primary mirror and having a mean ray parallel to the axis of the paraboloid is unobscured by the secondary mirror, is received by the secondary mirror and is reflected in a direction at 90° from the direction of the incident light beam to form an image at the second focus of the hyperboloid,
   the radii of curvatures of the two mirrors along their respective axes do not differ by more than 10%.

* * * * *